United States Patent [19]
Thuries et al.

[11] Patent Number: 5,530,200
[45] Date of Patent: Jun. 25, 1996

[54] THREE-PHASE METAL-CLAD ELECTRICITY LINE, AND METHOD OF MANUFACTURE

[75] Inventors: Edmond Thuries, Meyzieu; René Tixier, Lyons, both of France

[73] Assignee: GEC Alsthom T & D SA, Paris, France

[21] Appl. No.: 67,983

[22] Filed: May 27, 1993

[30] Foreign Application Priority Data

Jun. 3, 1992 [FR] France ................................ 92 06733

[51] Int. Cl.⁶ .................................................. H01B 7/00
[52] U.S. Cl. ...................... 174/24; 174/21 JS; 174/26 G
[58] Field of Search ..................................... 174/24, 25 R, 174/27, 8, 9 R, 25 C, 25 G, 25 P, 26 R, 26 G, 28, 21 R, 21 JS, 21 C, 21 CA; 307/147

[56] References Cited

U.S. PATENT DOCUMENTS 4,078,184  3/1978  Phelps et al. ............................ 307/147
5,089,665  2/1992  Thuries .................................... 174/27

FOREIGN PATENT DOCUMENTS 0423665  4/1991  European Pat. Off. .
2642578  8/1990  France .
2117170  10/1983  United Kingdom .

Primary Examiner—Kristine L. Kincaid
Assistant Examiner—Christopher Horgan
Attorney, Agent, or Firm—Sughrue, Mion, Zinn, Macpeak & Seas

[57] ABSTRACT

A three-phase metal-clad electricity line insulated by gas under pressure, the line including a plurality of lengths each constituted by modules that are assembled together end-to-end, each length being sealed relative to the outside and relative to adjacent lengths, two adjacent lengths being separated by a sliding junction enabling a length to be disassembled without losing gas from the adjacent length, the line being wherein the insulating gas is nitrogen under a pressure of a few tens of hectopascals, and preferably in the range 10 hectopascals to 15 hectopascals.

22 Claims, 13 Drawing Sheets

THREE-PHASE METAL-CLAD ELECTRICITY LINE, AND METHOD OF MANUFACTURE

The present invention relates to a three-phase metal-clad electricity line and to a method of manufacturing it.

BACKGROUND OF THE INVENTION

In French patent application No. 89 13 488 filed 16 Oct. 1989, the Applicant describes a metal-clad electricity line and a method of manufacturing it.

According to that document, each phase conductor is disposed in a coaxial tubular envelope made of aluminum, and each aluminum envelope is surrounded by a gastight coaxial envelope that is filled with a gas having good dielectric properties. The three gastight envelopes of a three-phase line are placed inside an underground gallery by means of appropriate supports.

It is already mentioned in that document that the three aluminum envelopes of a three-phase electricity line could be placed in a common gastight envelope that is buried or is placed inside an underground gallery.

The present patent application relates to implementing said solution, and thus relates to the various component elements of the metal-clad line and also to a method of installing it on site.

OBJECTS AND SUMMARY OF THE INVENTION

The present invention provides a three-phase metal-clad electricity line insulated by gas under pressure, the line comprising a plurality of lengths each constituted by modules that are assembled together end-to-end, each length being sealed relative to the outside and relative to adjacent lengths, two adjacent lengths being separated by a sliding junction enabling a length to be disassembled without losing gas from the adjacent length, wherein the insulating gas is nitrogen under a pressure of a few tens of hectopascals, and preferably in the range 10 hectopascals to 15 hectopascals.

In a preferred implementation, a module comprises three conductor bars disposed mutually in parallel along the edges of a prism whose base is constituted by an equilateral triangle, each bar being surrounded by a coaxial anti-dust metal envelope held by supports, the anti-dust envelopes being held at a distance from one another by insulating spacers, the assembly constituted in this way being surrounded by a steel envelope.

Each support comprises a cylindrical portion having the conductor bar passing therethrough and provided with electrical contacts that are separated by dust-sealing rings, the cylindrical portion carrying two insulating elements in the form of portions of a cone and provided with fixing means for fixing to the anti-dust envelopes.

Each spacer comprises two portions that are symmetrical about a plane and that are assembled together across said plane, each portion including one collar and one half-collar, a wheel placed between the collar and the half-collar, with a third wheel being interposed between the two symmetrical portions when they are assembled together.

Each envelope is constituted by two section members of semicircular section and assembled together by screwing into metal strips.

A support is disposed over each weld between two conductor bars of two adjacent modules.

A spacer is placed over each weld between anti-dust envelopes of two adjacent modules.

A sliding junction interconnects each pair of adjacent lengths, said junction comprising, in particular, a circular metal plate having two cylindrical portions of diameter close to that of the steel envelope extending on opposite sides thereof, said plate being pierced by three circular holes, each hole being fixed to a first base of a truncated insulating cone whose second base is constituted by a circular portion of a metal piece, an end terminal bar of one of the lengths being rigidly connected to said metal piece, the end conductor bar of the other length being in sliding electrical contact with said metal piece via a sleeve welded to said conductor bar and via a metal contact carried by a first ovoid-shaped piece forming an integral portion of said metal piece.

Advantageously, said metal contact is of the concertina type.

Said metal contact is disposed between two dust-proofing sealing rings.

The end bar fixed to said metal piece is fixed by means of a bolt screwed into said circular portion of said metal piece and connected to a sleeve welded to the end of the conductor bar.

Said sleeve is in electrical contact with a metal contact carried by a second ovoid-shaped piece forming an integral portion of said metal piece.

Advantageously, said metal contact is of the concertina type.

Said metal contact is disposed between two dust-sealing rings.

The cylindrical portions extend on either side of the circular metal plate that co-operates for the purposes of sealing the line relative to the outside with respective sleeves each provided with a fixing collar, said sleeves being provided with sealing rings.

The sleeves of the lengths to be connected together are held together by bolt rods passing through a collar of the metal plate.

The anti-dust envelopes are provided at the ends of the lengths to be connected together with welded sleeves co-operating with cylindrical portions that are secured to or integral with the circular metal plate.

The sliding junction is protected by a metal sheet welded to the sleeves.

An additional layer of metal cladding is disposed between the anti-dust envelopes and the steel envelope and is insulated therefrom by a plurality of insulators.

BRIEF DESCRIPTION OF THE DRAWINGS

The invention will be well understood from reading the following description of implementations, given with reference to the accompanying drawings, in which.

MORE DETAILED DESCRIPTION

Figure 1:
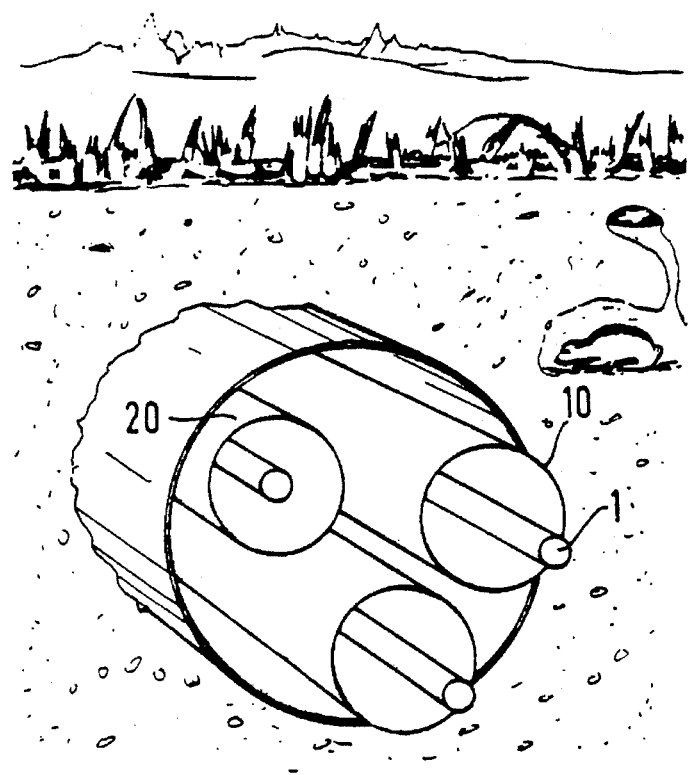
FIG. 1 is a diagrammatic fragmentary view of a three-phase metal-clad electricity line constituting a first embodiment of the invention.
Figure 2:
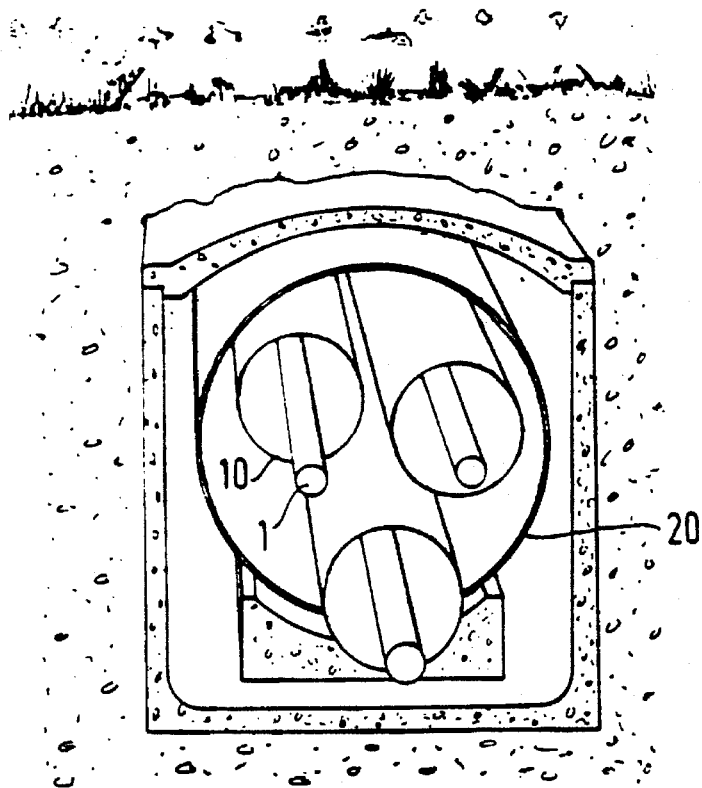
FIG. 2 is a diagrammatic fragmentary view of a three-phase metal-clad electricity line constituting a second embodiment of the invention.
Figure 3:
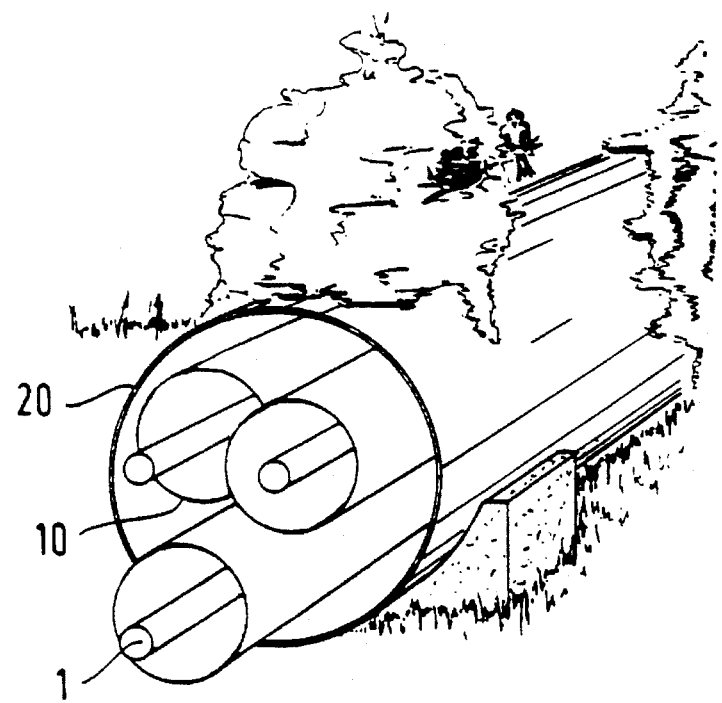
FIG. 3 is a diagrammatic fragmentary view of a three-phase metal-clad electricity line constituting a third embodiment of the invention.
Figure 4:
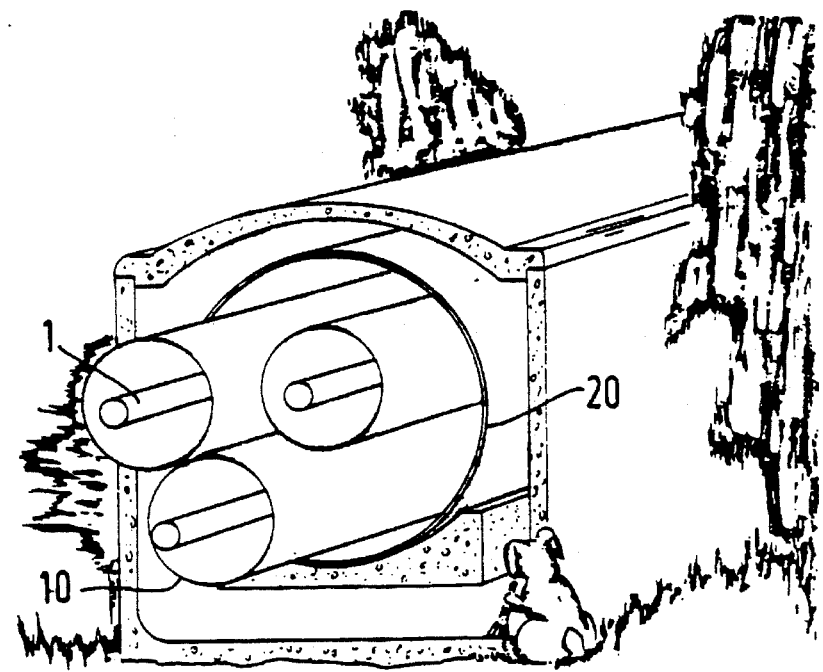
FIG. 4 is a diagrammatic fragmentary view of a three-phase metal-clad electricity line constituting a fourth embodiment of the invention.
Figure 5:
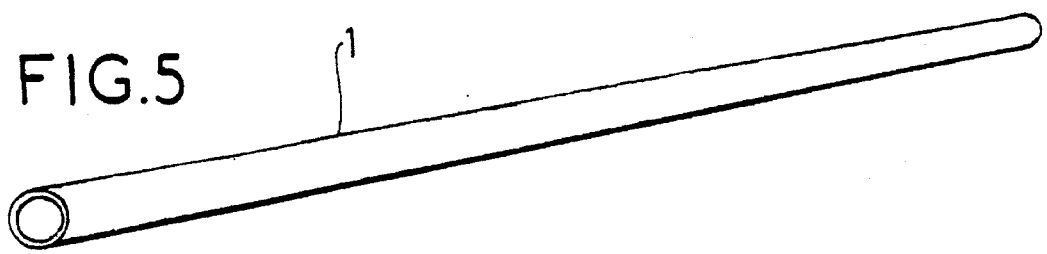
FIG. 5 is a perspective view of a conductor bar for a three-phase electricity line of the invention.
Figure 6:
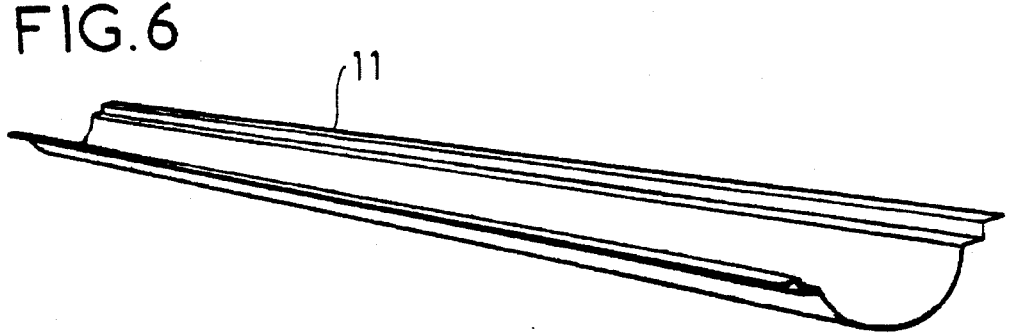
FIG. 6 is a perspective view of a section member for making an anti-dust envelope for a conductor bar.
Figure 7:
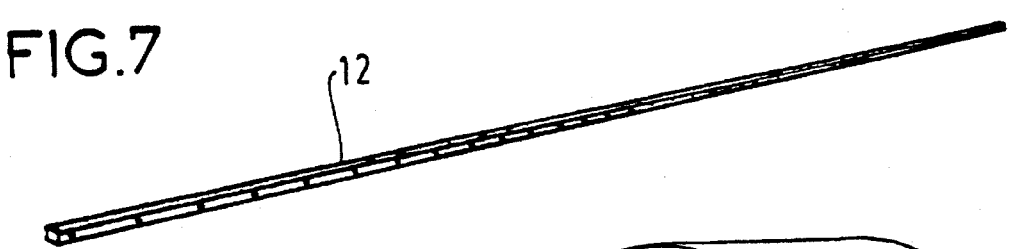
FIG. 7 is a perspective view of a metal strip for fixing together two section members of an anti-dust envelope.

The three-phase metal-clad electricity line of the invention may be buried without protection, as shown in FIG. 1, or with the protection of concrete casing, as shown in FIG. 2. In a variant, the line may be above ground, either placed on the ground supported by a concrete slab, as shown in FIG. 3, or else placed in concrete casing, as shown in FIG. 4.

In all of the examples, there can be seen the conductor bars 1 of the three-phase link, each surrounded by a respective metal envelope such as 10, protecting them from dust, the entire assembly being surrounded by a gastight outer tube 20 of welded steel that contains nitrogen under pressure.

The component elements of the metal-clad line are delivered to the assembly site; they are shown in FIGS. 5 to 11, in which there can be seen:

the conductor bars 1 (FIG. 5) which are made of copper and are delivered to the site in modules that are about 10 meters (m) long, and they are assembled on site to form lengths that are about 100 meters long;

section members 11 (FIG. 6), also referred to as "half-shells", for building the anti-dust envelopes; these half-shells are about 10 meters long and they are semicircular in section, suitable for being assembled in pairs by being screwed together using assembly strips 12 (FIG. 7) to form a tubular envelope; the envelopes are welded end-to-end on site in order to form lengths that are about 100 meters long; the envelopes are preferably made of aluminum that is a few tenths of a millimeter thick;

protected metal sheet for junctions between lengths (FIG. 8) provided in the form of steel half-shells 15A and 15B, and assembled-together by welding, as described in detail below;

outer envelopes 20 (FIG. 9) implemented in the form of steel tubes that are about 10 meters long and provided with welded inside slideways 21 for a purpose explained below. These envelops are thick enough to withstand, without danger, a nitrogen pressure of a few tens of hectopascals, said pressure preferably lying in the range 10 hectopascals to 15 hectopascals;

insulating supports 30 (FIG. 10) serving to assemble the bars and the half-shells of the anti-dust envelopes; and insulating spacers 40 (FIG. 11) for supporting the insulating envelopes.

The above elements are used to build a module that is therefore preferably 10 meters long. Lengths are preferably made up of ten modules, and they are therefore preferably 100 meters long. Naturally, these dimensions are given purely by way of example and they may be modified, e.g. depending on the nature of the ground.

Special components are used at the ends of each 100-meter length; they are described below.

Figure 12:
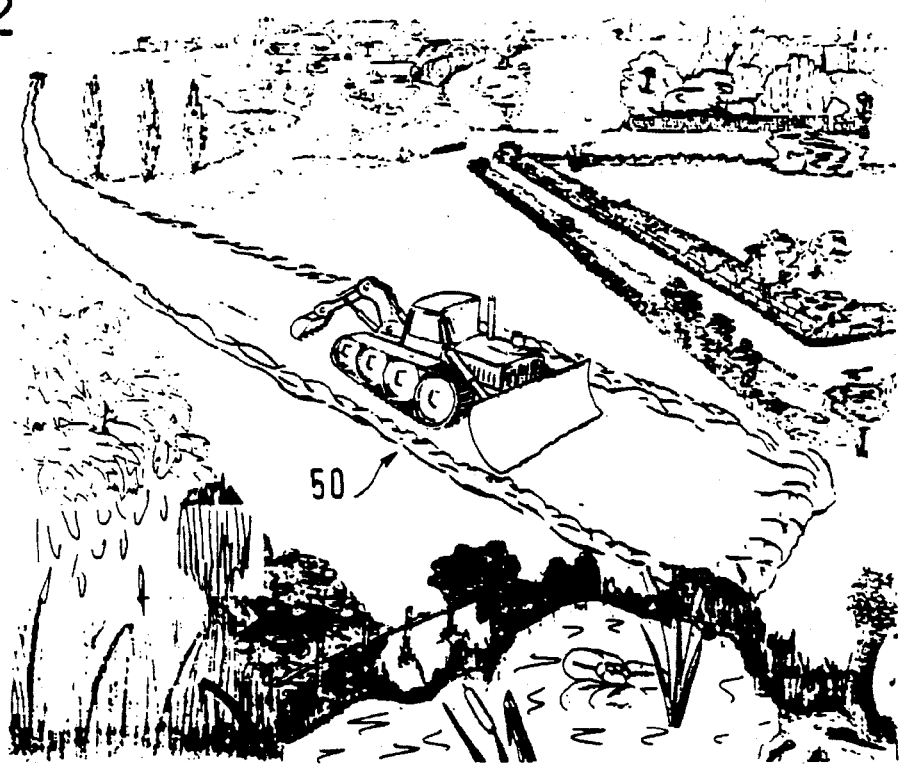
FIG. 12 shows earth works prior to constructing a three-phase metal-clad electricity line of the invention.

FIG. 12 shows the path of a three-phase electricity line of the invention; earth-moving equipment 50 can be seen for leveling the ground ahead and for digging a trench behind in which the metal-clad line is to be placed and buried.

Figure 13:
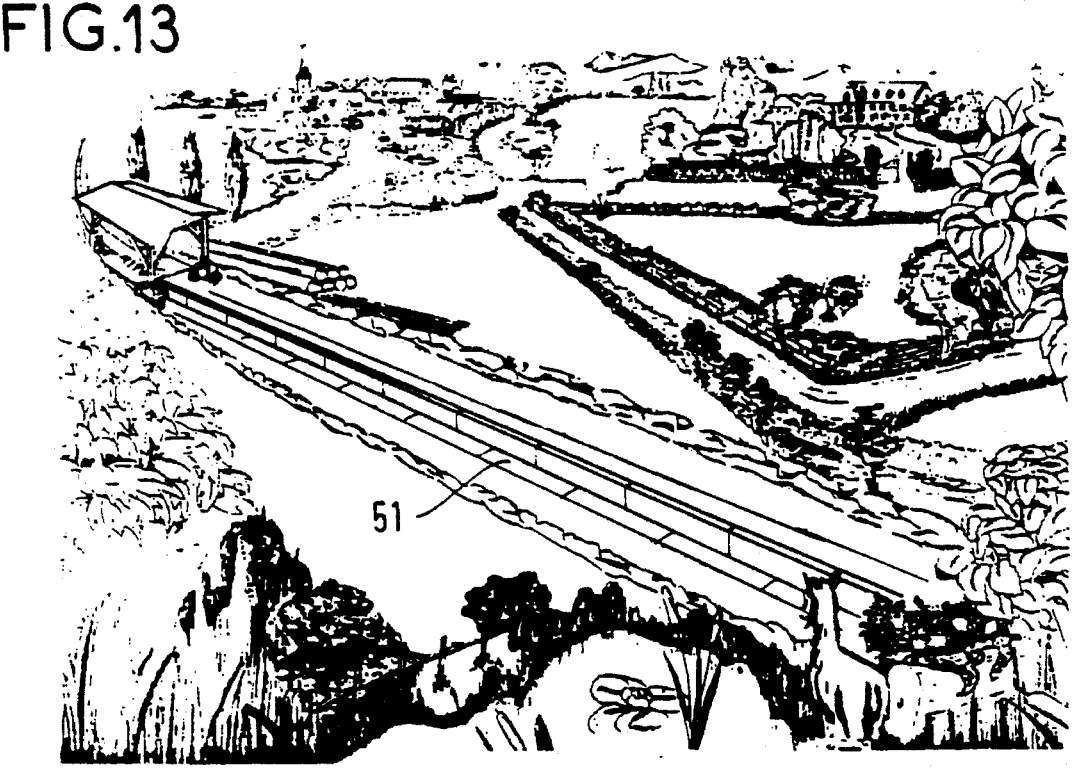
FIG. 13 shows optional installation of a concrete gully for receiving the line.

As can be seen in FIG. 13, a concrete gully 51 may be installed to receive the line.

Figure 14:
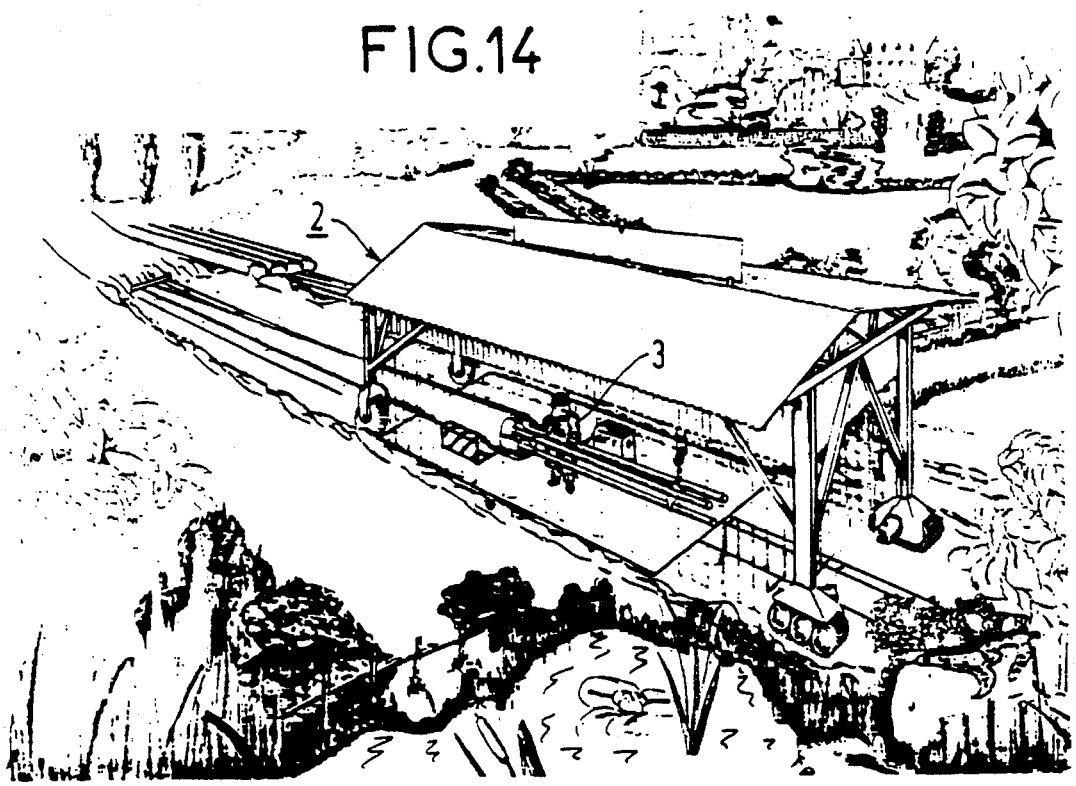
FIG. 14 shows a moving dust-free workshop for assembling the component elements of the metal-clad line of the invention.
Figure 15:
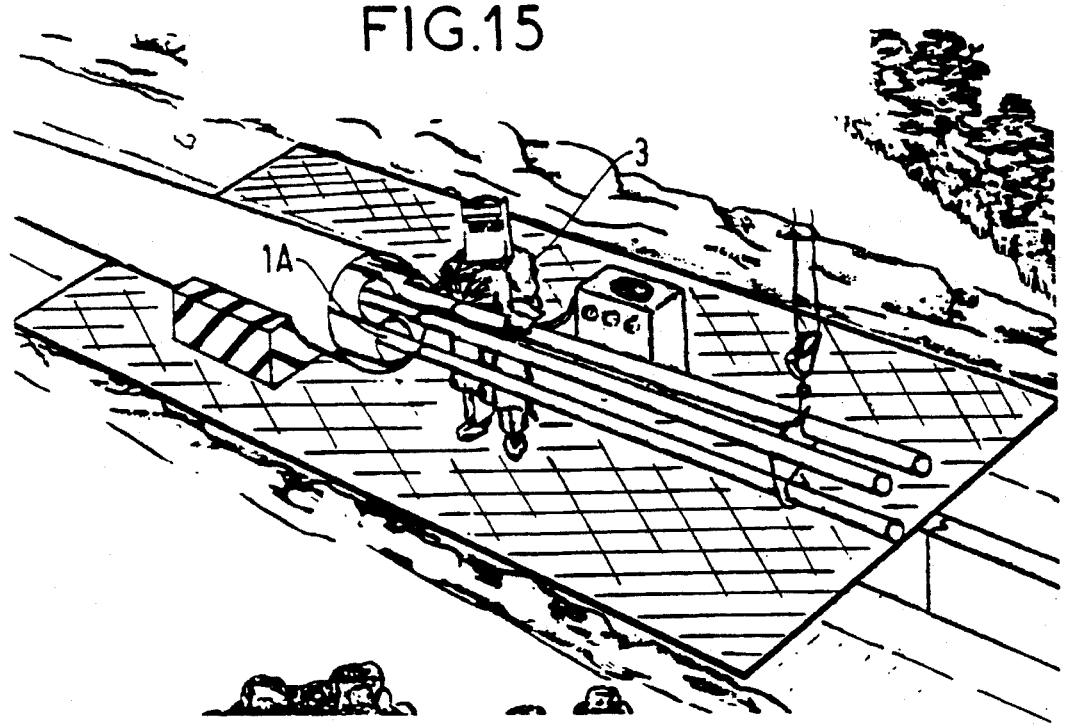
FIG. 15 shows an operator performing a welding operation between two adjacent phase conductors, inside the moving dust-free workshop.

FIG. 14 shows line construction in progress. A lightweight moving shelter 2 that provides a dust-free environment protects the operator 3 who is welding together two adjacent conductor bars 1A belonging to the same phase.

In the description below, the letters A, B, and C are used to distinguish the various electrical phases of the line; the symbol ' (prime) is used to distinguish two corresponding elements belonging to two adjacent lengths.

Figure 16:
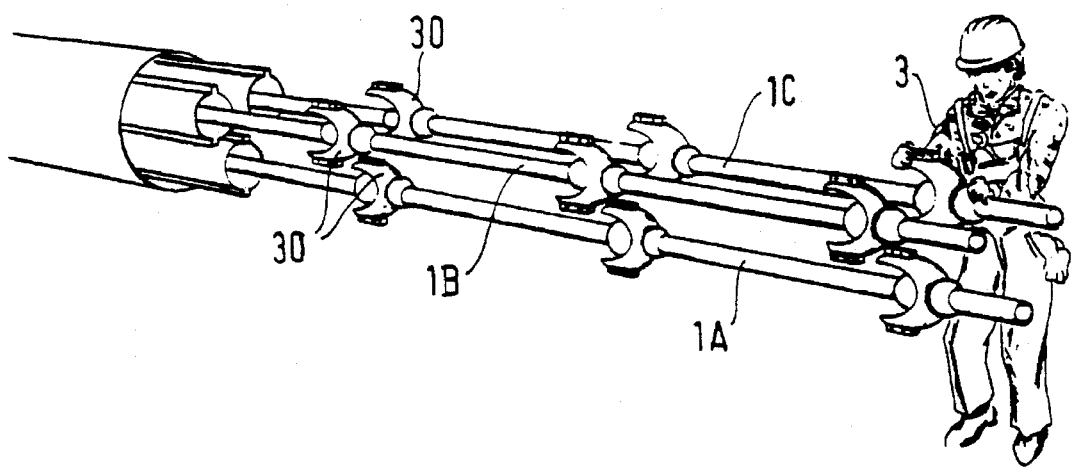
FIG. 16 shows the installation of bar supports.

As can be seen in FIG. 16, the operator fits insulating supports 30 on each of the phase conductor bars 1A, 1B, and 1C, and places them at regular intervals, preferably in the range 1 meter to 5 meters, in such a manner as to ensure that the welds between the bars of the same phase are located inside such supports.

Figure 10:
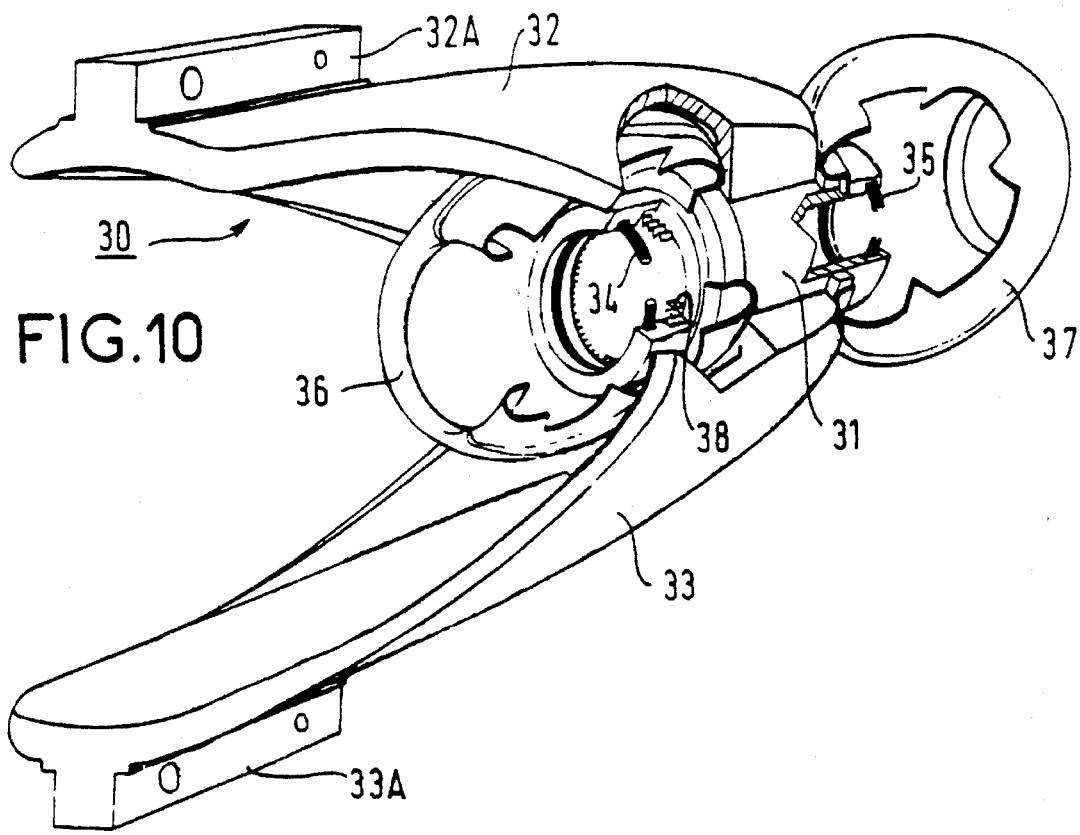
FIG. 10 is a perspective view of an insulating support for supporting the conductor bars inside the anti-dust envelopes.

The insulating support 30 shown in perspective and partially cut away in FIG. 10 comprises a metal cylindrical inner portion 31 in which the bar is engaged; this portion is made of aluminium or of copper. Two insulating elements 32 and 33 in the form of portions of a cone are disposed on the metal portion symmetrically about the axis of the support; each of these insulating elements is surmounted by a flange 32A, 33A in the form of a rectangular block provided with folds for use in positioning and bolting together the two half-shells that provide the bars with protection against dust. The insulating elements 32 and 33 are preferably made of alumina-filled epoxy resin or of quartz araldite, but they may alternatively be made of porcelain.

The cylindrical portion has two grooves provided with O-rings 34 and 35 for keeping any dust that may arise inside the support. The support is provided with two metal anti-corona caps 36 and 37 that are substantially spherical and situated on either side of the cylindrical body 31. These caps are raised to the potential of the conductor bar by means of electrical contacts, such as concertina-type contact 38.

Figure 17:
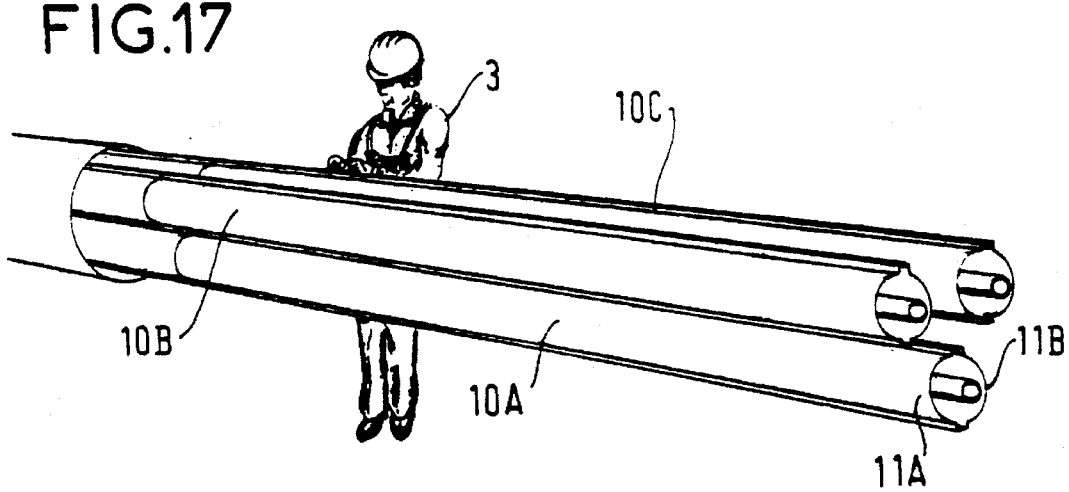
FIG. 17 shows the installation of half-shells around the conductor bars.

FIG. 17 shows the operator fixing the anti-dust protective envelopes 10A, 10B, and 10C each made up of two half-shells such as 11A and 11B on the insulating supports of the conductor bars for each phase. Fixing is performed by means of screws with fixing strips such as that shown in FIG. 7 being disposed on either side of each half-shell along two contact zones. These strips are preferably made of aluminum.

Figure 18:
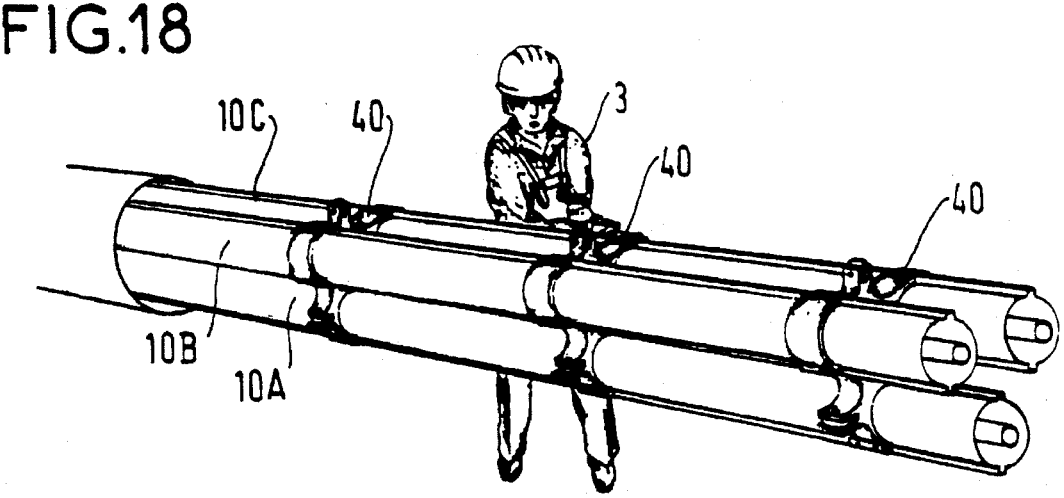
FIG. 18 shows installation of the insulating spacers.

FIG. 18 shows the operator 3 securing the three-phases of the line to one another by means of spacers 40 placed around the envelopes 10A, 10B, and 10C, preferably over the insulating supports 30.

Figure 11:
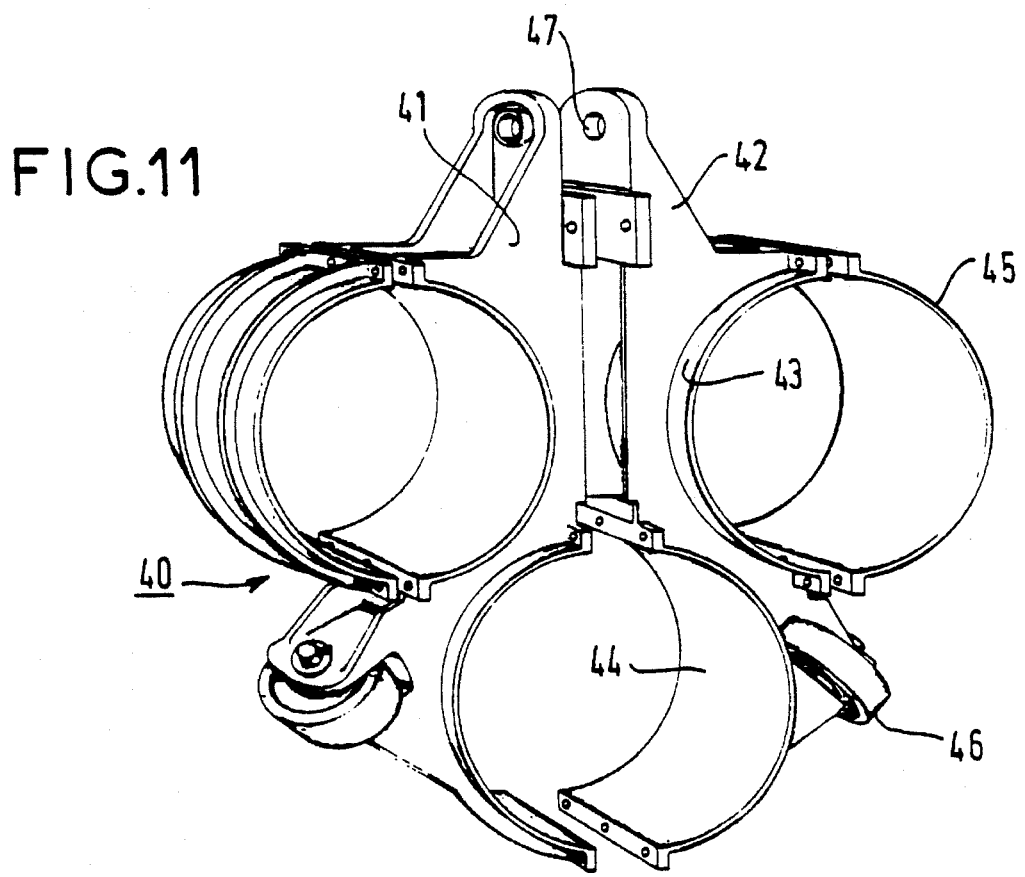
FIG. 11 is a perspective view of a spacer for supporting the anti-dust envelopes.

A spacer 40 is shown in detail in FIG. 11. The spacer includes a framework that is preferably made of glass-filled polyamide.

The spacer comprises two portions 41 and 42 that are symmetrical about a plane. Only the portion 42 is described in detail: it comprises two half-collars 43 and 44 that are disposed in such a manner that, after assembly, their axes coincide with the axes of two of the conductor bars of the metal-clad line. One of the half-collars, 43, is associated with a half-collar 45 by means of screws. The other half-collar, 44, is associated with the corresponding half-collar of the other portion 41. Thus, when the two portions 41 and 42 are fixed together, they define three collars whose parallel axes constitute the edges of a prism whose base is an equilateral triangle. A housing is provided between the half-collar 43 and the half-collar 44 for the purpose of receiving a wheel 46. At one end, the portion 42 defines an axis 47 which, in co-operation with the corresponding feature of the portion 41, defines an axis for another wheel (not shown) whose axis is at 120° to the axis of the wheel 46. Thus, by juxtaposing the two portions 41 and 42 it is possible to make a spacer having three wheels whose running planes constitute the faces of a triangle-based prism, which planes are tangential to a circle.

Figure 19:
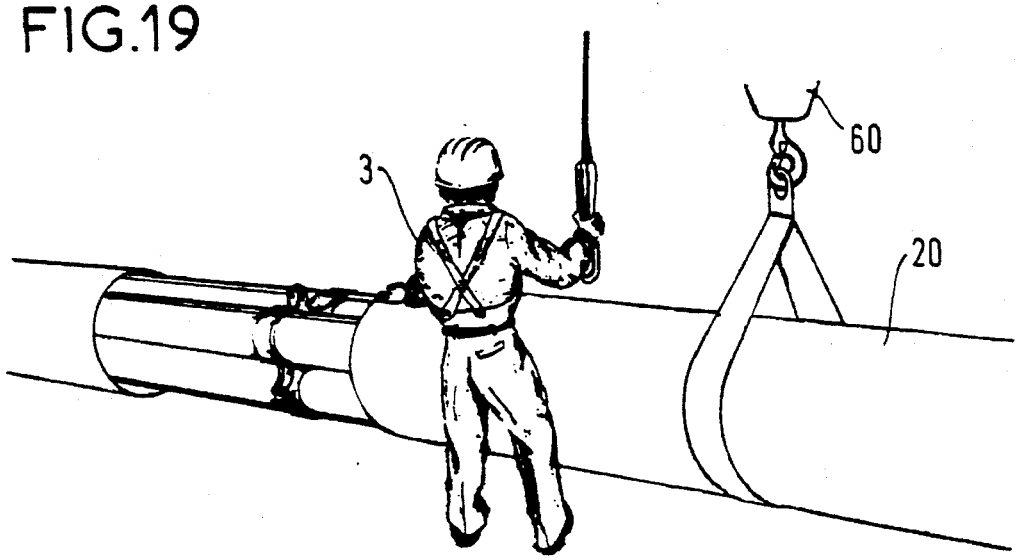
FIG. 19 shows the operation of installing a steel envelope around the assembly constituted by three conductor bars and their anti-dust envelopes.

The wheels are intended to enable the assembly constituted by the conductor bars and their anti-dust envelopes inside a gastight metal envelope, as now shown with reference to FIG. 19.

FIG. 19 shows the operator 3 using a crane 60 for engaging a steel envelope module 20 around an assembly of the type described above. As mentioned with reference to FIG. 9, the steel envelope has slideways 21 for guiding the wheels and for keeping the assembly in a given orientation.

The steel envelopes are made up of modules that are each 10 meters long.

Figure 20:
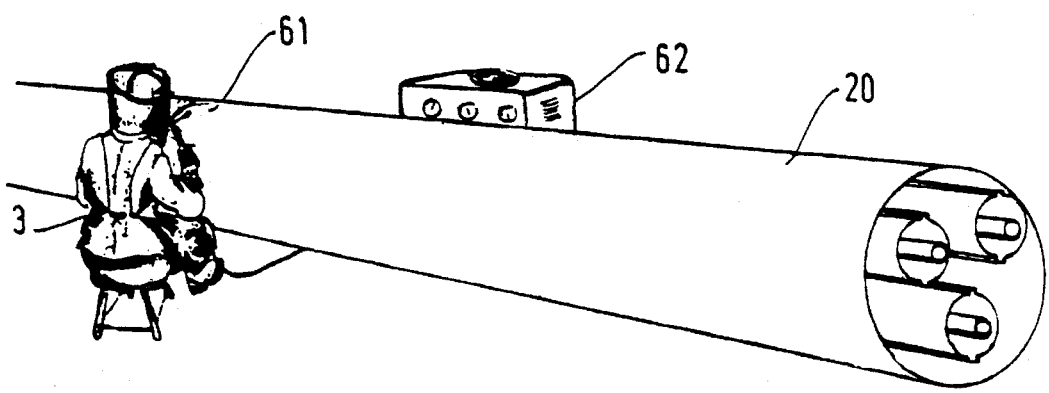
FIG. 20 shows two adjacent steel envelopes being welded together.

FIG. 20 shows the operator 3 welding a module 20 to an adjacent module using a welding head 61 powered from a welding station 62.

When a 100-meter long length of line has been built up, it is closed by means of special elements that are now described. Each length is independent from adjacent lengths with respect to nitrogen insulation. As a result, if action needs to be performed on any one length, there is no need to empty the entire line, but only the length in question.

Figure 21:
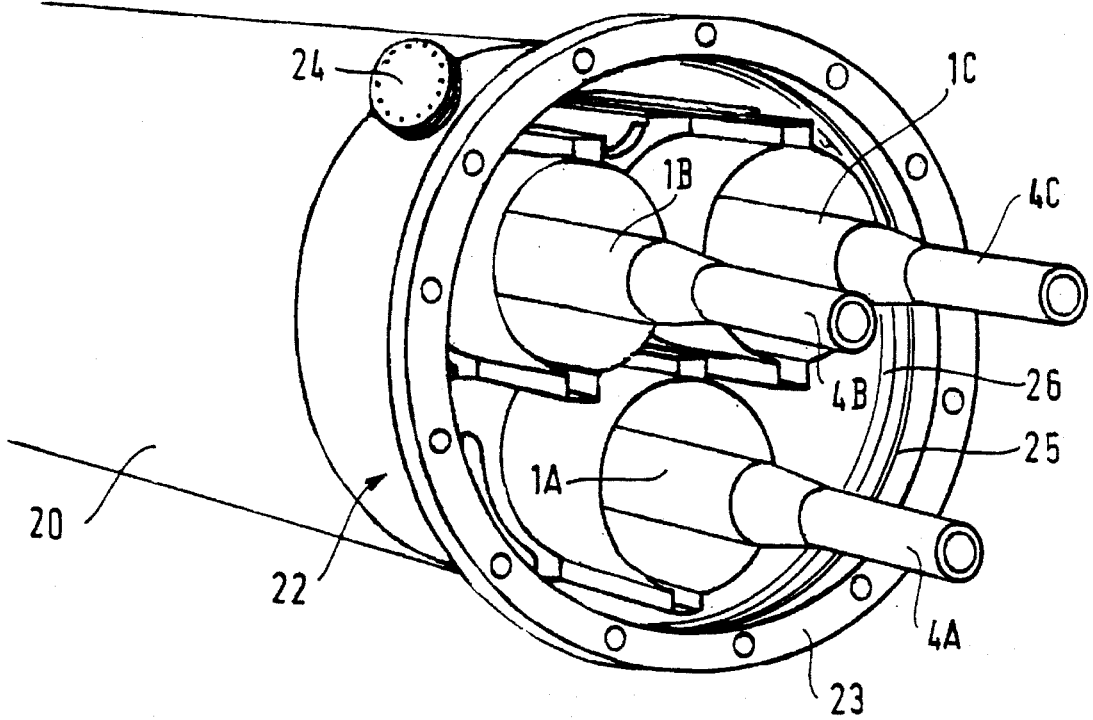
FIG. 21 is a perspective view of the end of a length showing the welded sleeve and bar endpieces.

At the end of the last module of a length, as shown in FIG. 21, endpieces 4A, 4B, and 4C are welded to the ends of the conductor bars 1A, 1B, and 1C. A sleeve 22 is welded to the end of the steel envelope 20 and has a fixing flange 23, at least one hatch 24, and two sealing rings 25 and 26.

Figure 22:
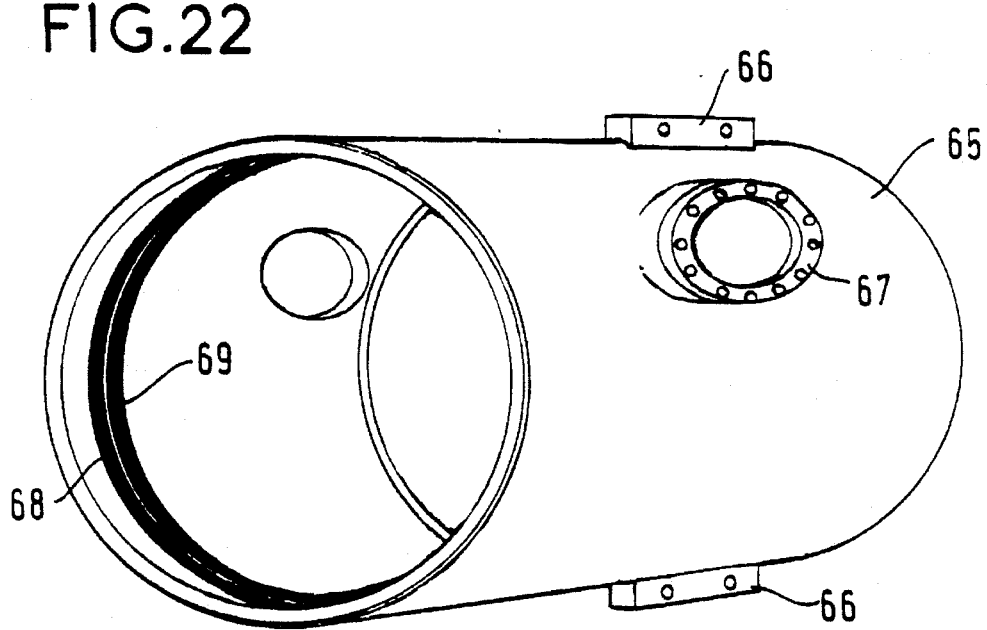
FIG. 22 is a perspective view of a dust-proofing sleeve fixed to the ends of the anti-dust envelopes at the end and at the beginning of a length.

Each anti-dust envelope 10A, 10B, and 10C receives an end sleeve of the kind shown in FIG. 22 and given overall reference 65. This sleeve includes fixing blocks such as 66, hatches such as 67, and inside grooves 68 and 69 for receiving sealing O-rings.

Figure 23:
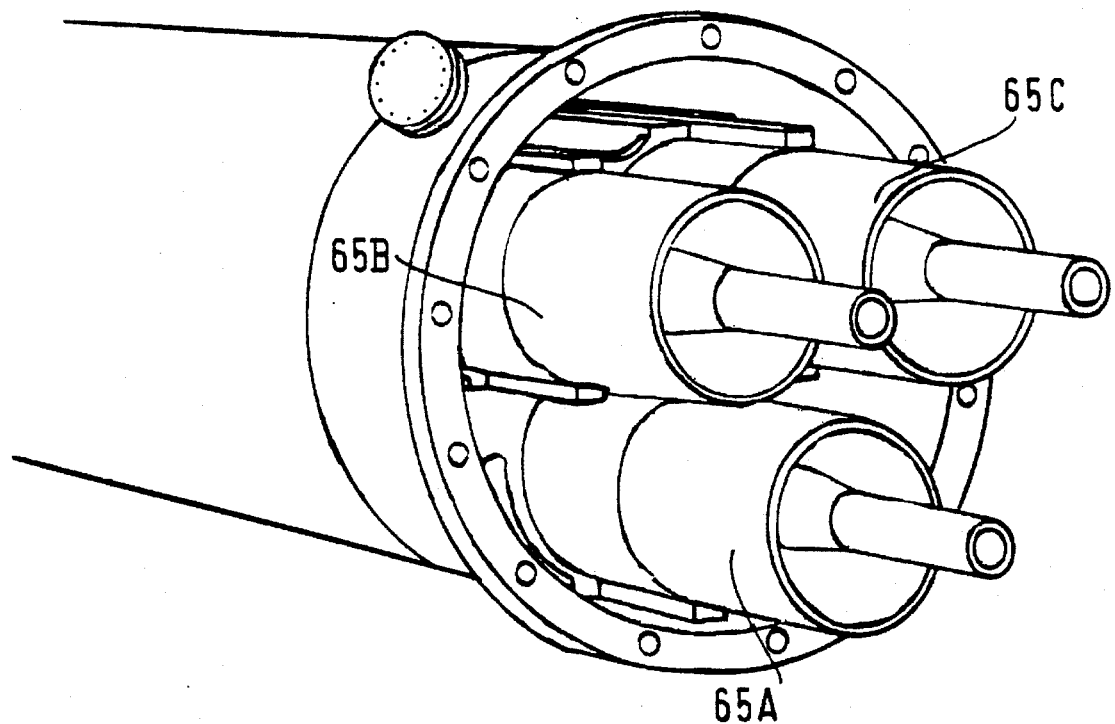
FIG. 23 is an end view of a length of electricity line after the dust-proofing sleeves have been installed.

FIG. 23 shows the end of the line after the anti-dust sleeves 65A, 65B, and 65C have been installed.

The line is then ready to receive the sliding end junction which is now described with reference to FIG. 24.

The sliding junction comprises a metal piece 70 (e.g. made of steel) constituted by a disk 71 extended on either side by cylindrical portions 72 and 73 for co-operating with the end sleeves. In the figure, end-of-length end sleeve 22 can be seen co-operating with the cylindrical portion 72 in order to provide sealing for the length situated to the left of the figure, sealing being provided by the sealing rings 25 and 26. The beginning-of-length end sleeve for the righthand length that co-operates with the cylindrical portion 73 is described further on.

The sliding junction carries an outer collar 75 provided with holes that perform a function which is described below.

The disk 71 includes three circular openings provided with means for providing sealing between lengths, electrical insulation, and the flow of electricity from one length to another. Each of these openings corresponds to one of the phases of the line, and the equipment of one opening only is described in detail, since the other two openings are equipped in the same way.

Figure 24:
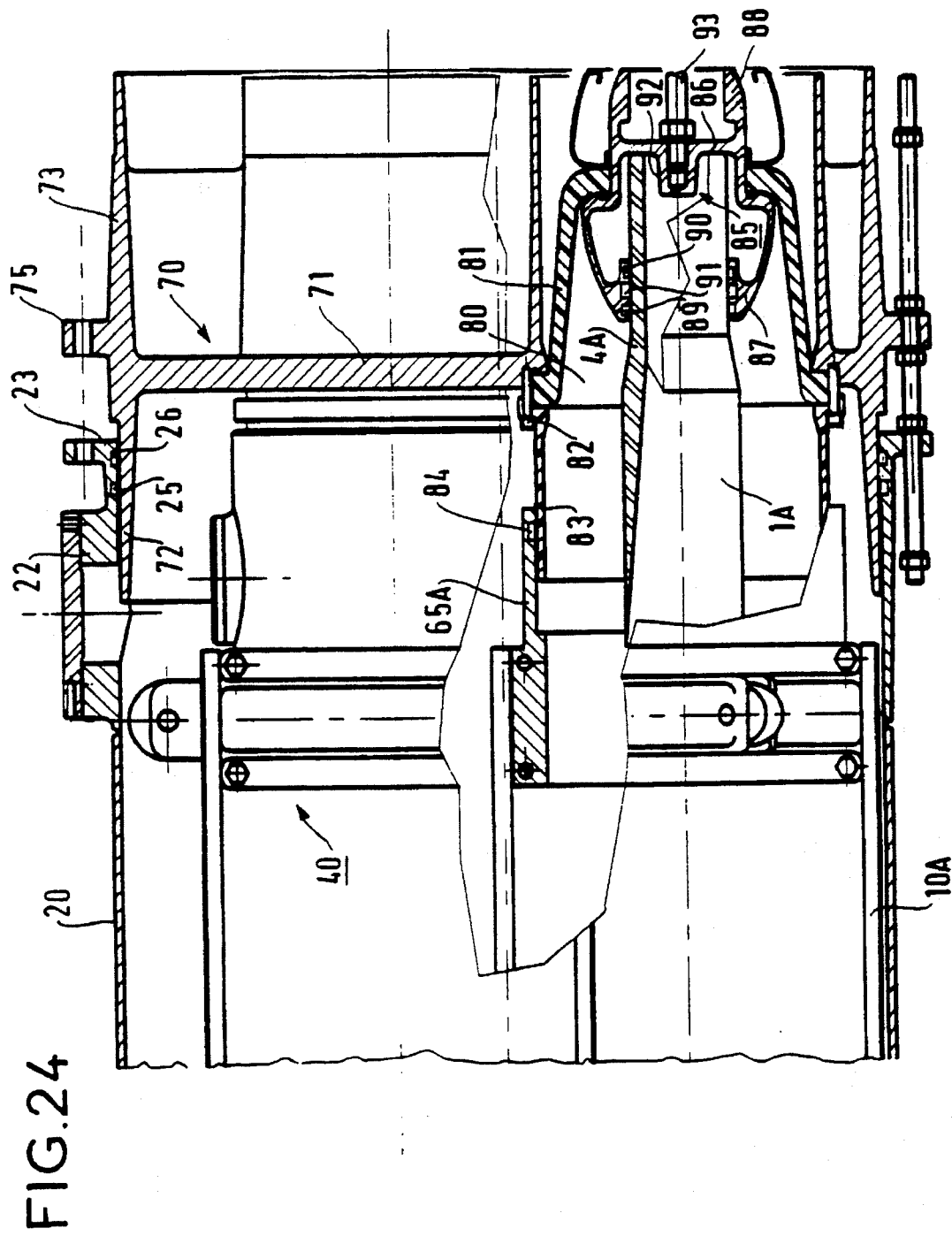
FIG. 24 is a fragmentary axial section view of the metal-clad line at the end of a length thereof, and showing, in particular, the sliding end-of-length junction.

The opening 80, corresponding to phase A, and visible in FIG. 24 is provided with an insulating cone 81 fixed by screws 82 to the disk 71. The same screws are used for fixing an insulating cylinder 83 that cooperates with the above-described sleeve 65A carrying a sealing ring 84 and serving to protect conductor bar 1A from dust. The insulating cone 81 carries a metal piece 85 that includes a central disk 86 with two ovoid-shaped metal pieces 87 and 88 extending from opposite sides thereof and having the conductor bars engaged therein.

The piece 87 carries sealing rings 89 and 90 that surround an concertina-type electrical contact 91. The endpiece 4A of the bar 1A is engaged inside the piece 87 and comes into contact with the contact 91, thereby enabling electricity to flow from endpiece 4A to the piece 88, the endpiece 4A moves freely inside the metal piece 87 as a function of expansions of the conductor bar 1A.

It may be observed that the piece 87 carries a tapped cylindrical central portion 92 suitable for receiving a fixing rod 93 of the end sleeve 4'A of the first conductor bar 1'A of the righthand length. The piece 88 carries sealing rings 97 and 98 surrounding a metal contact 96 of the concertina type for co-operating witch the endpiece 4'A.

Figure 25:
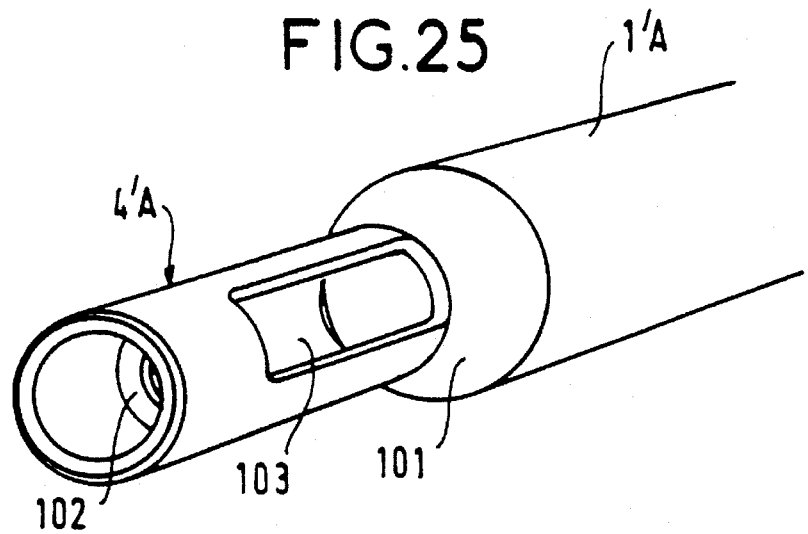
FIG. 25 is a perspective view of an endpiece for a beginning-of-length conductor bar.
Figure 27:
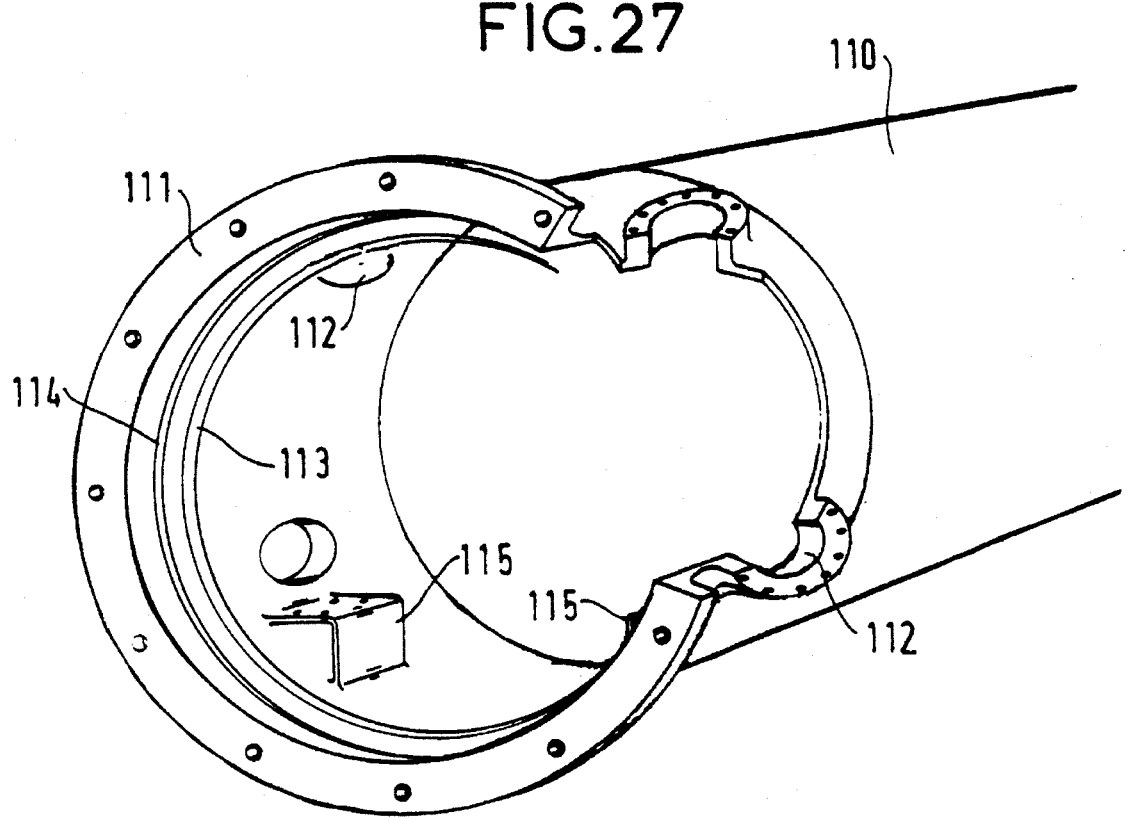
FIG. 27 is a perspective view of the sealing sleeve welded to the outer envelope at the beginning of a length.

The endpiece is shown in FIG. 25. It comprises a conical portion 101 for connection to conductor bar 1'A, an inner fastening ring 102 and an opening 103 through which tightening tools can be passed.

Figure 26:
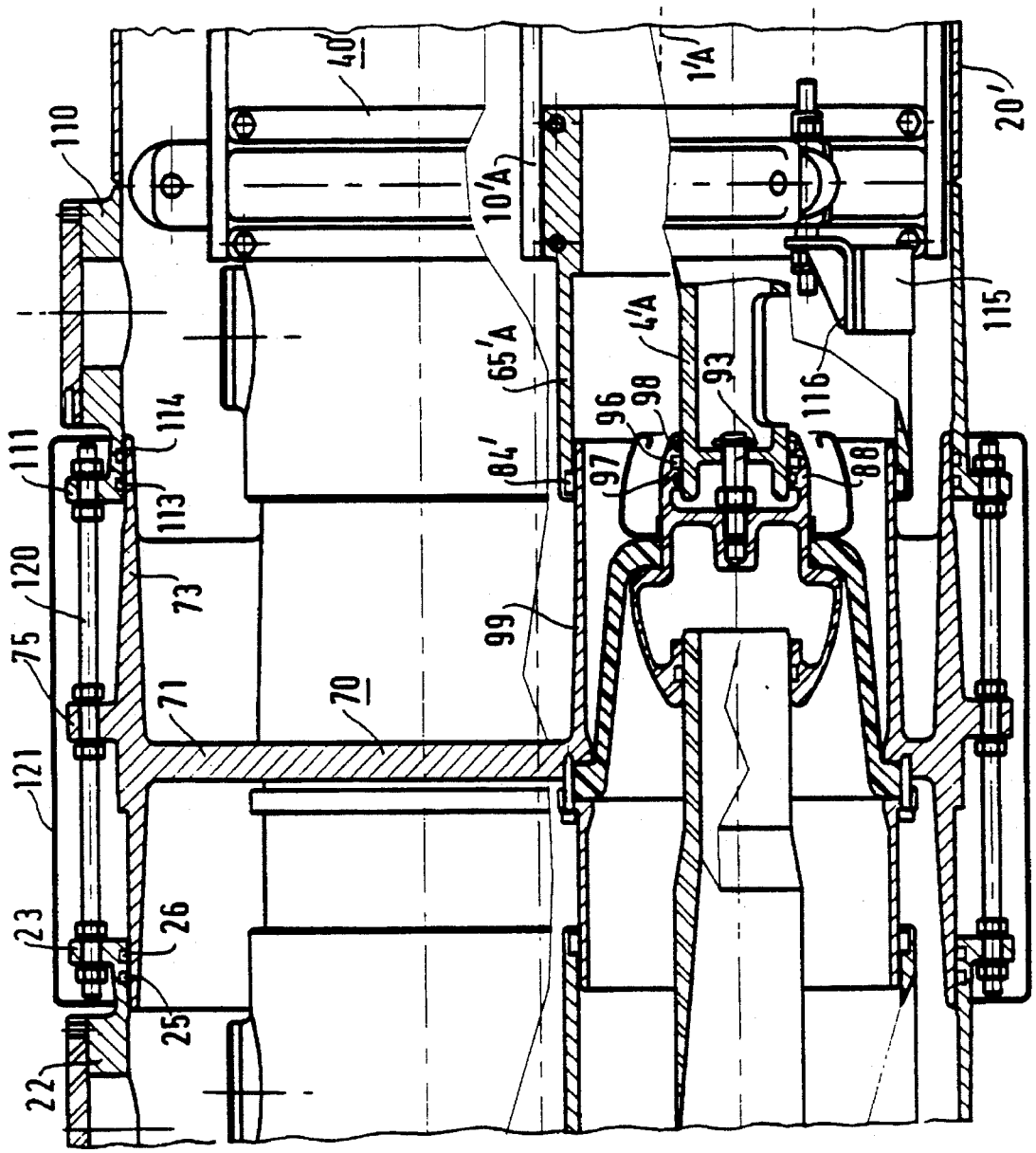
FIG. 26 is a fragmentary axial section view of the metal-clad line at the junction between two adjacent lengths.

FIG. 26 shows how two lengths are assembled together by means of the sliding junction.

The conductor bars of the righthand length are provided with respective endpieces of the type shown in FIG. 25; in FIG. 26, there can be seen conductor bar 1'A together with its endpiece 4'A, fixed by means of rod 93 to disk 85.

A sleeve 110 is welded to the outer envelope 20' of the righthand length, which sleeve includes a fixing collar 111, hatches 112 enabling assembly to be performed, sealing rings 113 and 114, and welded tabs 115 whose role is explained below.

The sleeve 110 co-operates with the cylindrical portion 73 to provide sealing of the righthand length relative to the outside. The two lengths are connected together by bolted rods 120 engaging in the collar 23 of the sleeve 22 (lefthand length), in the collar 75 of the sliding junction, and in the collar 111 of the sleeve 110.

Endpiece 4'A co-operates with an electrical contact 96 of the concertina type placed in the ovoid piece 88. As for the lefthand length, the concertina contact is disposed between two sealing rings 97 and 98 ensuring that any dust that may be produced by the contact does not propagate.

The tabs 115 serve to receive brackets 116 for securing the sleeve 110 to the first spacer 40' of the righthand length, by means of bolts 117.

As for the lefthand length, the anti-dust envelope 10'A of the righthand length is extended by an anti-dust sleeve 65'A which co-operates with a cylindrical portion 99 of the sliding junction, with a sealing ring 84' being interposed therebetween.

Figure 8:
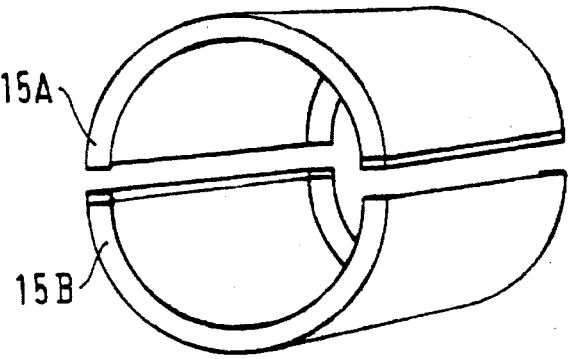
FIG. 8 is a perspective view of two halves of protective metal sheet for the ends of lengths of the metal-clad line of the invention.
Figure 9:
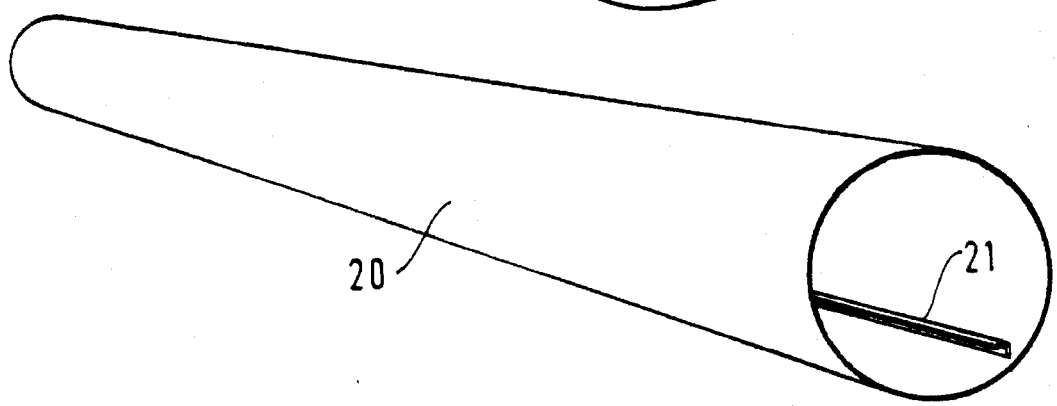
FIG. 9 is a perspective view of an outer envelope for a metal-clad line of the invention.

The junction is protected from shock, from bad weather, and from dust by a cylindrical metal sheet 121 which is welded onto the sleeves 22 and 110, and which is made up from two section members as shown in FIG. 8.

Should it be necessary to take action in one of the lengths, e.g. the righthand length in FIG. 26, the procedure is as follows:

the metal sheet 121 is sawn off and removed;
the rods 120 are loosened;
the junction 70 is slid to the left; and
symmetrical operations are performed at the other end of the righthand length.

The righthand length can be withdrawn by lateral displacement, and it may be replaced, for example, by an identical length by performing the same operations in the opposite order.

It may be observed that the time during which the line is taken out of service is very small since these operations are simple, few in number, and do not require highly qualified personnel to perform them. The line can be brought back into operation rapidly since only one length needs to be put back under pressure.

In general, the steel envelope is grounded about once every hundred meters, and it is electrically connected to the anti-dust envelopes of the conductor bars. In the event of a major internal fault, the aluminum anti-dust envelopes may be punctured, but not the steel envelope.

Figure 28:
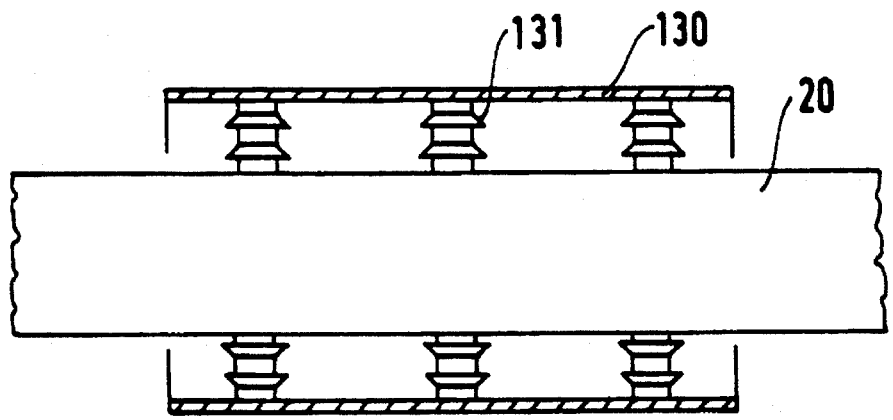
FIG. 28 is a diagram showing a portion of metal-clad line provided with an additional layer of metal cladding.

If, for special reasons (e.g. in an urban environment), it is not possible to earth the envelope every hundred meters, thereby giving rise to two grounding points that are a long way apart, e.g. 800 meters apart, there is a risk of a dangerous potential arising on the envelope in the event of a fault and the aluminum envelopes being perforated. That is why, such portions of line are enclosed, as shown in FIG. 28, within an additional layer of metal cladding 130, made of steel, which is insulated from the outer envelope 20 by means of insulators 131 made of porcelain or of epoxy resin.

The invention is applicable to making three-phase electricity lines that are cheap, reliable, easy to maintain, and that are not harmful to the environment.

We claim:

1. A three-phase metal-clad electricity line insulated by gas under pressure, the line comprising a plurality of lengths, each of said lengths comprising a plurality of modules connected end-to-end, each of said lengths being sealed relative to an outside of said line and relative to an adjacent one of said lengths, adjacent ones of said lengths being separated by a sliding junction enabling one of said lengths to be disassembled without losing gas from the adjacent one of said lengths, wherein said modules each comprise three conductor bars disposed mutually in parallel along the edges of a prism having a base shaped as an equilateral triangle, said bars being surrounded by coaxial anti-dust metal envelopes and held therein by supports, said anti-dust envelopes being held at a distance from each other by insulating spacers, and wherein an outer envelope surrounds an assembly defined by said conductor bars, said supports, said anti-dust envelopes and said insulating spacers.

2. A metal-clad line according to claim 1, wherein each of said supports comprises a cylindrical portion having one of said conductor bars passing therethrough and electrical contacts separated by dust-sealing rings, the cylindrical portion carrying two insulating elements shaped as portions of a cone and having fixing means for fixing said conductor bars within the anti-dust envelopes.

3. A metal-clad line according to claim 1, wherein each of said spacers comprises two portions that are symmetrical about a plane and that are assembled together across said plane, each one of said two portions including one collar and one half-collar, wherein a wheel is disposed between the collar and the half-collar, and a third wheel is interposed between the two symmetrical portions when they are assembled together.

4. A metal-clad line according to claim 1, wherein said outer envelope comprises two section members of semicircular section and two assembly strips for securing the two section members together.

5. A metal-clad line according to claim 1, wherein one of said supports is disposed over a weld formed between the conductor bars of adjacent ones of said modules.

6. A metal-clad line according to claim 1, wherein one of said spacers is placed over a weld formed between the anti-dust envelopes of adjacent ones of said modules.

7. A metal-clad line according to claim 1, wherein said sliding junction interconnects adjacent ones of said lengths, said junction comprising a circular metal plate having two cylindrical portions with diameters closely approximating a diameter of the outer envelope and extending on opposite sides of said circular metal plate, said plate being pierced by three circular holes, wherein three truncated insulating cones are fixedly secured, respectively, in said holes at a first base portion of said cones, a second base portion of each of said cones comprises a circular metal piece, an end of one of said bars in a first one of said modules is rigidly connected to said metal piece, and an end of another one of said bars in a second one of said modules is in sliding electrical contact with said metal piece via a first sleeve welded to said another one of said bars and via a metal contact carried by a first ovoid-shaped piece forming an integral portion of said metal piece.

8. A metal-clad line according to claim 7, wherein said metal contact is of the concertina type.

9. A metal-clad line according to claim 6, wherein said metal contact is disposed between two dust-proofing sealing rings.

10. A metal-clad line according to claim 7, wherein said one of said bars in a first one of said modules is rigidly connected to said metal piece by a bolt screwed into said circular metal piece and connected to a second sleeve welded to an end of said one of said bars.

11. A metal-clad line according to claim 10, wherein said second sleeve is in electrical contact with another metal contact carried by a second ovoid-shaped piece forming an integral portion of said metal piece.

12. A metal-clad line according to claim 11, wherein said another metal contact is of the concertina type.

13. A metal-clad line according to claim 11, wherein said another metal contact is disposed between two dust-sealing rings.

14. A metal-clad line according to claim 7, further comprising sleeves fixedly secured to respective ends of said adjacent ones of said lengths, said sleeves cooperating with said cylindrical portions of said metal plate for sealing the ends of said adjacent ones of said lengths, each of said sleeves comprising a fixing collar and sealing rings.

15. A metal-clad line according to claim 14, further comprising a bolt rod passing through the fixing collar on each of said sleeves and through another collar disposed on the metal plate for holding said adjacent ones of said lengths together.

16. A metal-clad line according to claim 7, further comprising sleeves secured to ends of each of said anti-dust envelopes, said sleeves co-operating with cylindrical projections protruding from said three circular holes in said circular metal plate.

17. A metal-clad line according to claim 14, further comprising a metal sheet welded to said sleeves for protecting said sliding junction.

18. A metal-clad line according to claim 1, wherein a layer of metal cladding is disposed between said anti-dust envelopes and said outer envelope, and said layer of metal cladding is insulated from said anti-dust envelopes and said outer envelope by a plurality of insulators.

19. A multi-phase metal-clad electricity line insulated by gas under pressure, the line comprising a plurality of lengths, each of said lengths comprising a plurality of modules connected end-to-end, each of said lengths being sealed relative to an outside of said line and relative to an adjacent one of said lengths, adjacent ones of said lengths being separated by a sliding junction enabling one of said lengths to be disassembled without losing gas from the adjacent one of said lengths, wherein said modules each comprise a plurality of conductor bars disposed mutually in parallel, said bars being surrounded by coaxial anti-dust metal envelopes held therein by supports, said anti-dust envelopes being held at a distance from one another by insulating spacers, and wherein an outer envelope surrounds an assembly defined by said conductor bars, said supports, said anti-dust envelopes and said insulating spacers.

20. A three-phase metal-clad electricity line as recited in claim 1, wherein the insulating gas is nitrogen gas under a predetermined pressure.

21. A three-phase metal-clad electricity line as recited in claim 20, wherein the predetermined pressure is in a range of from about 10 hectopascals to about 15 hectopascals.

22. A three-phase metal-clad electricity line as recited in claim 1, wherein said outer envelope is a metal outer envelope.

* * * * *